United States Patent [19]

Bloomberg et al.

[11] Patent Number: 5,642,279
[45] Date of Patent: Jun. 24, 1997

[54] TECHNIQUE FOR UTILIZING A COMPUTER SYSTEM TO PROVIDE PRICE PROTECTION TO RETAIL CUSTOMERS

[75] Inventors: Samuel J. Bloomberg, Brookline; Jeffrey S. Stone, Pembroke, both of Mass.

[73] Assignee: New England Audio Company, Canton, Mass.

[21] Appl. No.: 287,862

[22] Filed: Aug. 9, 1994

[51] Int. Cl.[6] .................................................... G06F 17/00
[52] U.S. Cl. ............................................. 395/214; 395/220
[58] Field of Search ..................................... 364/401, 405, 364/401 R

[56] References Cited

U.S. PATENT DOCUMENTS 5,056,019 10/1991 Schultz et al. ........................ 364/405
5,117,355 5/1992 McCarthy ............................ 364/405

OTHER PUBLICATIONS

Computer and Software News, V3, n12, p. 26, Mar. 25, 1985; "Murphy's Mart Uses Handleman for All Software", Abstract, Dialog file 275, No. 01115510.

Adweek New England Advertising Week, Aug. 23, 1993; "Tweeter Unveils Price Protection Program", Full Text, Dialog file 16, No. 04594933.

Annual Report, 1989, "Luskin's—Marketing Procedures"; Dialog file 16, No. 02276566.

Seymour, Jim; "Corporate Buyers Deserve Price Protection", PC Week, v8, n49, p. 69, Dec. 9, 1991; Dialog file 275, No. 01461988, Full Text article.

Freedman, Beth; "IBM makes moves to shore up dealer support", PC Week v3, n15, p. 148; Apr. 15, 1986 Dialog file 275, No. 01176015, Full Text article.

McConville, James A.; "New Beachheads"; HFD—The Weekly Home Furnishings Newspaper, V67, n39, p. 89, Sep. 27, 1993, Dialog file 148, No. 05519377, Full Text.

*Primary Examiner*—Gail O. Hayes
*Assistant Examiner*—Frantzy Poinvil
*Attorney, Agent, or Firm*—Wolf, Greenfield & Sacks, P.C.

[57] ABSTRACT

A technique for utilizing a computer system to provide price protection to retail customers of a dealer for its least selected goods. Information on each retail transaction for the goods and information on selected goods advertised for sale by others within a selected geographic area are entered into the computer system. The computer system then determines at selected time intervals whether automatic rebates are due to any customers, rebates being due when the computer determines that a product of the selected goods purchased by the customer has been advertised at a lower price by another dealer within the selected time period after the purchase transaction. The computer also prints a check to the customer for the determined difference when it determines that a rebate is due with the check being sent to the customer.

19 Claims, 2 Drawing Sheets

TECHNIQUE FOR UTILIZING A COMPUTER SYSTEM TO PROVIDE PRICE PROTECTION TO RETAIL CUSTOMERS

FIELD OF THE INVENTION

This invention relates to a technique for utilizing a computer to provide price protection to retail customers for at least selected goods over a selected period.

BACKGROUND OF THE INVENTION

Retail customers, particularly for relatively large ticket items such as televisions, high-fidelity systems, appliances, cameras and the like, are generally concerned when they make a purchase that they are getting the best price. This may result in the customer visiting a number of retail dealers before making a purchase decision and the customer delaying the purchase in the hope that the price of the product will go down so that they can obtain a better buy.

However, for the retailer, once the customer leaves the store without making a purchase, there is a very good chance that the sale has been lost. Stores have therefore tried to ease the customer's concern that they will not obtain the best price by offering various types of price protection policies. Typically such policies guarantee the customer that if the same product is advertised for sale by another retailer within the geographic area where the purchase is being made at a lower price within some specified time period, for example thirty (30) to sixty (60) days, the customer can obtain a rebate of the difference between the advertised and the purchase price by bringing the advertisement and his sales slip to the dealer. However, such programs are only marginally attractive to potential customers since they require the customer to monitor competitive advertisements over the period, something which few customers have the time, patience or capability of doing. They also require the customer to travel to the dealer, which may be located at some distance from the customer, and involve a substantial amount of the customer's time. Saving documents is also a problem as is determining if the purchased and advertised products are in fact the same from the limited information in many advertisements. Therefore, unless the difference in price is substantial, customers frequently do not take advantage of such programs.

A need, therefore, exists for an improved price protection program for retail customers which does not require substantial time and effort on the part of the customer, yet assures the customer that if the product is advertised for a lower price during a specified period after the purchase, he will automatically obtain the benefit of such lower advertised price.

SUMMARY OF THE INVENTION

Heretofore, the provision of an automatic price protection program for each transaction or for at least selected transactions, for example transactions for particular classes of goods, or goods having greater than a selected price, has been considered to be too time consuming and expensive to implement. The applicants have, however, found that by using a computer to implement such a program, it can be performed in a cost-effective manner.

Therefore, this invention provides a method and technique for utilizing a computer system to provide price protection to retail customers of a dealer for at least selected goods. The method involves the steps of:

a) storing in the computer system information on each retail transaction for the goods. Such information should include at least customer information such as the customer's name, address, and telephone number, product identification information for each product of the selected goods involved in the transaction, the date of the transaction and the price paid for each identified product;

b) storing in the computer information on the selected goods advertised for sale by others within a selected geographic area. The selected geographic area is typically the geographic area in which the store making the sale is located, but, for example with catalog sales, may be defined as other catalogs for the same products. The stored competitive information may include product identification, date of advertisement and advertised price. For a preferred implementation, this step is performed by skilled personnel who know standard prices being offered by the dealer and only store information where the advertised price for the product is lower than the dealer's standard price for the same product;

c) utilizing the computer to determine at selected time intervals whether automatic rebates are due to any customers, rebates being due when the computer determines that a product of the selected goods purchased by the customer has been advertised at a lower price by another within a selected time period after the purchase transaction; and d) for each rebate which is determined due, printing a check to the customer for the difference between the price paid by the customer and the lower advertised sale price. The printed check is then mailed to the customer, for example by having the customer name and address on the check show through an envelope window or through use of a mailing label printed by the computer from the stored transaction information.

Step (c) may include the steps of comparing advertised products stored during step (b) against transaction products stored during step (a) to find matches and verifying that dates for the advertised product and the transaction product are within the selected time period. Step (c) may also include the step of comparing the transaction price to the advertised price for matching products to determine if the advertised price is less, and if so by how much. This step would not be required if only lower prices are entered during step (b). Where steps (a), (b) and (c) are performed for a plurality of different geographic areas, step (c) could also include the step of assuring that the retail transaction and the advertised sale are for the same geographic area. This could be accomplished for example by performing step (c) separately for each geographic area or by including a geographic indication with each entry made during steps (a) and (b) and, during step (c), comparing geographic indications for products on which a rebate may be due. Step (c) may also include the step of determining the lowest advertised price for a selected time period for each product entered during step (b). Further, for areas where there is a sales tax, step (c) may include the steps of computing the sales tax on the difference between the transaction price and advertised price and adding the computed sales tax to the determined difference to determine the amount to be rebated to the customer. Step (c) should also include the step of updating information in the computer system on a transaction to reflect any rebate sent to the customer.

Step (d) may be performed by printing a check each time it is determined during step (c) that a rebate is due; however, it is preferable that step (c) include the step of storing information on each rebate when it is determined that a rebate is due and then utilizing this stored information during step (d) to print the checks.

The foregoing other objects, features and advantages of the invention will be apparent from the following more particular description of a preferred embodiment of the invention as illustrated in the accompanying drawings.

IN THE DRAWINGS

DETAILED DESCRIPTION

Figure 1:
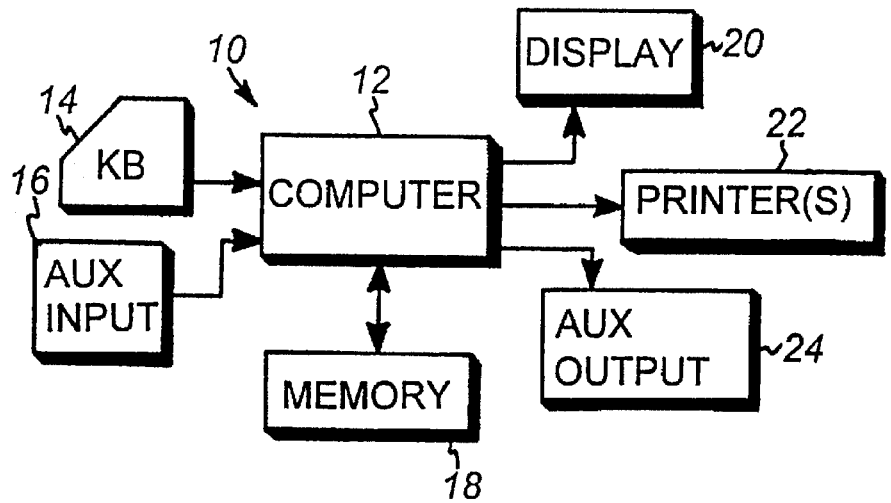
FIG. 1 is a schematic block diagram of a computer system which might be utilized in practicing the teachings of the invention.

FIG. 1 shows a computer system 10 of a type which may be utilized in practicing the teachings of this invention. The system includes a computer or processor 12, a keyboard 14, auxiliary input devices 16 (such as a mouse, touch screen, or other input devices known in the art), memory 18, which may be divided into active storage elements and bulk storage (such as tape or disk), and a variety of output devices which may include a CRT or other display 20, one or more printers 22 (which may for example include a special check and/or label printer) and other auxiliary outputs 24 as required. While a single computer system 10 is shown in FIG. 1, two or more computer systems may be utilized in practicing the invention with, for example, PCs, work stations, or other point-of-sale devices being utilized to input and collect information which is then loaded into a main processor where rebate calculations may be made.

Figure 2:
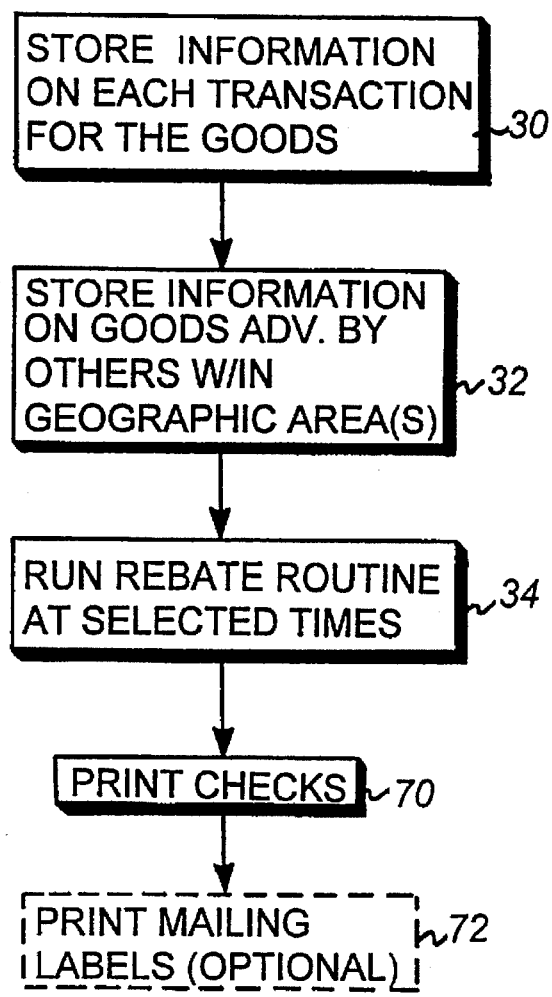
FIG. 2 is a block flow diagram of a method in accordance with the teachings of this invention.

FIG. 2 is a general flow diagram of the method or technique of this invention. Referring to this figure, information is stored for each sales transaction for at least selected goods (step 30). While in some situations the program of this invention would be run for all goods being sold at each retail location, the program is primarily designed to operate for larger ticket items. Thus, transaction information for purposes of this invention may be stored only for certain classes of goods, for example televisions, VCRs, cameras, various types of high fidelity equipment, etc., or may be stored only for products having a sales price greater than some predetermined threshold, for example fifty dollars. Alternatively, information on all products sold is stored in system 10, as would generally be the case for many businesses, but only information for the selected goods are utilized in the program of this invention. The information stored during step 30 would include, but is by no means limited to, the name, address, telephone number, and other selected information on the customer making the purchase, the product or products sold for the transaction, the price for each product sold, the date of the transaction, the manner of payment, sales tax information, the dealer location from which the product was purchased, and the like. The transaction information may be stored on-line as the information is entered by the clerk making the sale, or may be stored off-line, for example at the dealer location, and bulk entered into system 10, for example at the end of each day.

During step 32 information is stored in memory 18 of computer 12 on goods advertised by others in the selected geographic area or areas. At this time, advertisements for the goods are found by manually scanning various newspapers, and other publications containing advertisements for each geographic area in which retail stores in the program are located, scanning relevant catalogs, or the like. While this function may be performed by a relatively low-skilled individual who merely keys appropriate information into the system each time the individual sees an advertisement for the goods, for at least one implementation, the function is performed by the buyers or other knowledgeable people in the organization of the business running the program who are familiar with the prices charged for various products by their organization and only enter advertised products and prices of competitors into the system when the advertised price for the product is lower than the standard price they are charging. While this procedure results in more expensive people being involved in the performance of step 32, it simplifies overall procedures in that the number of competitive price entries in the system is significantly reduced. This significantly reduces the processing time required to identify customers entitled to rebates and, as will be discussed in greater detail later, eliminates one step from this computational operation. The information entered into the system during step 32 would include a product identification, the advertised price and the dates during which the advertised price is in effect. Where the system covers more than one geographic area, the input would also contain a suitable indication of geographic area for the advertisement. This could be a geographic area code or could be a code indicative of the publication from which the advertisement was taken or the dealer offering the lower price.

During step 34 the rebate routine is run. While this routine may be run daily, typically it is run at much less frequent intervals. Examples of times at which the rebate routine might be run include once a week, biweekly, and once a month. The routine can be run at off hours when the computer is being underutilized and need not necessarily be run at regular intervals or at the same time each week or month.

Figure 3:
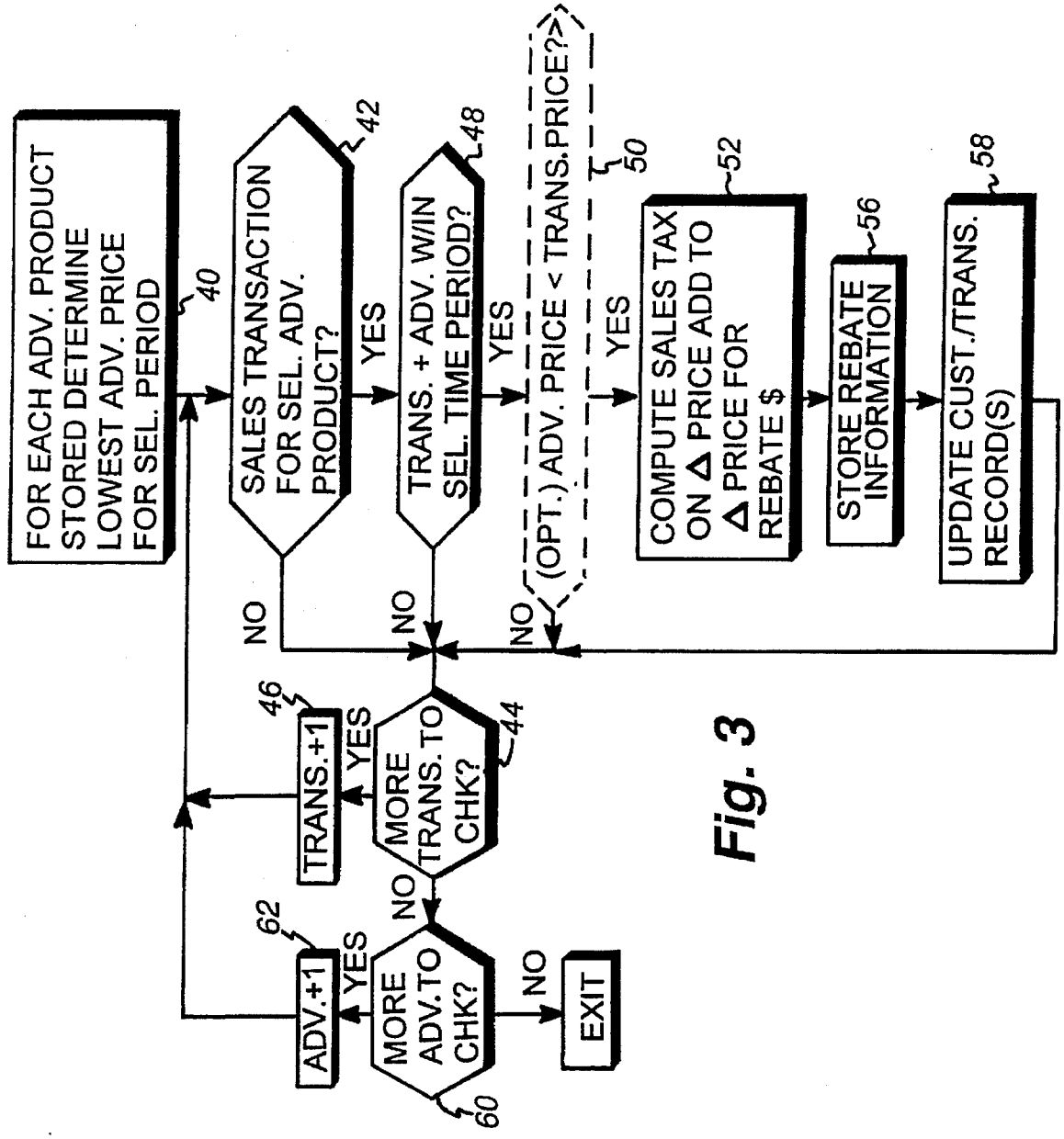
FIG. 3 is a block flow diagram of the "rebate routine" shown in FIG. 2.

Referring to FIG. 3, which is a flow diagram of the rebate routine, it is seen that the first step in this operation, step 40, is to determine for each advertised product stored in the system the lowest advertised price for the product during the selected period. Where the system covers two or more geographic areas, a lowest advertised price could be determined for each geographic area. Step 40 may be performed by finding an advertised product, storing the advertised price for the product and then scanning the listing of stored advertised products to find any other listings for the same product. For each other listing found, the price for such listing is compared with the stored price and the price for such listing is stored in lieu of the store price if it is lower. This procedure could be repeated for each product for each geographic area being covered.

Once lowest advertised prices are determined, the operation proceeds to step 42 where a particular advertised product is selected and a determination is made by scanning sales transactions during the preceding period whether there have been any sales transactions for the selected advertised product. Assuming, for example, that the price guarantee is good for thirty days and that the rebate routine is run once a week, the routine would be looking each week at sales transactions which became thirty days old during the preceding week and at advertised prices for the preceding thirty day period. If during step 42, no match is found on a given sales transaction, the operation proceeds to step 44 to determine if there are more sales transactions to look at. If there are more sales transactions to look at, the sales transaction looked at is incremented during step 46 and step 42 is repeated for the next sales transaction.

When during step 42 a match is found between the selected advertised product and a product sold for the sales transaction, the operation proceeds to step 48 during which a determination is made as to whether both the transaction and the advertisement are within the selected time period. Thus, if the routine were being run on April 15th and the advertisement started to run on April 13th, there would be a "YES" output during step 48 if the transaction occurred on March 14th, but there would be a "NO" output during step 48 if the transaction occurred on March 12. A "NO" output during step 48 results in step 44 being performed to cause the next transaction to be looked at.

A "YES" output during step 48 either causes optional step 50 to be performed or causes a branch to step 52. If step 32 is performed in the manner discussed above for one implementation where advertised products and prices are entered into the system by knowledgable personnel who only make such entries when the advertised price is less than the standard price of the product for the dealer running the program, then all that would be required during step 50 would be to determine the actual price difference. However, if all advertised prices for the class of goods of which rebates are being given are entered into the system, then during step 50 a determination is made as to whether the advertised price for the product is less than the price paid by the customer for the transaction being looked at. If the price is not less, the operation returns to step 44 to cause the next transaction to be looked at. If the price is less, the price difference is determined and the operation proceeds to step 52 to compute the sales tax (assuming the geographic area has a sales tax) on the determined price difference and to add the determined sales tax to the price difference to get the amount to be rebated.

During step 54, information on the rebate to be given to the customer is stored in an appropriate area of, for example, memory 18. This information would include the name and address of the customer, the amount of the rebate check and any other information which it is desired to print on the rebate check or to provide to the customer in a letter accompanying the rebate check. For example, a form letter may be sent with the rebate check which informs the customer of the product on which the rebate is being given and the company policy which resulted in the rebate, or such information may be printed on the check.

The operation then proceeds to step 58 to update the customer transaction record or records. This assures that the dealer has a record of the rebate so that the rebate is deducted in the event a refund is subsequently given to the customer on the product. It also adjusts sales figures for purposes such as paying sales tax, determining profits, determining mall lease payments which may be based on sales from a store, determining salesmen commissions or other purposes.

Once step 58 has been completed, the operation returns to step 44 to look at the next transaction. The process described above continues with successive transactions during the selected time period being compared against the selected advertised product until, during step 44, it is determined that all relevant transactions have been looked at. When that occurs, the operation branches to step 60 to determine if there are more advertised products to be looked at. If a "YES" output is obtained during step 60, the operation advances to the next advertised product during step 62 and the operation then returns to step 42 to compare the new selected advertised product against the products of sales transactions during the preceding selected time period. This process is repeated until all transactions have been compared against the new selected advertised product, at which time the operation again branches to step 60 to determine if there are more advertised products to be looked at. This process continues until, during step 60, a "NO" output is obtained, meaning that all stored advertised products have been compared against relevant transactions. At this time the rebate routine is complete and the operation exits from rebate routine.

Referring again to FIG. 2, it is seen that when the rebate routine step 34 is completed, the operation proceeds to step 70 to print rebate checks utilizing the information stored during step 56. While checks could be printed in lieu of storing the information during step 56, it has been found to be faster and more efficient to store the information during the rebate routine and to print the checks in bulk during step 70 rather than to print the checks each time a determination is made that a rebate check is required during the running of the rebate routine. During step 70 the information stored during step 56 is looked at in sequence and is utilized to print the checks to customers in a standard fashion. A printer such as printer 22 may be utilized for this purpose.

For a preferred embodiment, the checks are mailed in an envelope having a transparent window which shows the customer's name and address so that printing labels are not required. However, if it is desired not to use envelopes having transparent windows, the information on customer name and address stored during step 56 may also be utilized to print mailing labels during step 72 or to print customer name and address information directly on the envelope. The envelope would also typically contain additional legends advising the customer that a check is contained in the envelope rather than junk mail so that the envelope does not get thrown out unopened.

A procedure is thus provided for utilizing a computer system to automatically provide rebate checks to a customer in the event a product purchased by the customer from the dealer is advertised for sale at a lower price by another within the geographic area during a selected time period after the sale. The customer does not need to scan newspapers and other publications to see if the product is being offered at a lower price by others, does not have to return to the store with a sales slip, and does not have to worry that he has paid more than he needed to pay. The customer is assured that with no action on his part he will receive the benefit of any lower price advertised by any other dealer in the geographic area for the selected time period.

While the invention has been described above with respect to a preferred embodiment, it is apparent that in addition to the variations which have been discussed above, other variations are also possible. Thus, while it is believed preferable to compare the advertised products against the sales transactions since there will typically be a far lesser number of advertised products, particularly if such products are screened by knowledgeable personnel so that only advertised products offered a lower price are actually entered into the system, then there will be transactions during the time period. However, the invention can also be practiced by matching each transaction product against the stored advertised products. Further, while a step to determine if the geographic area for the transaction and for the advertised product are the same is not shown in FIG. 3, where advertised products for several geographic areas are stored in system 10, this step may be required. Alternatively, the rebate routine could be run separately for each geographic area. Further, while for the preferred embodiment a determination is made only at the end of the selected period, for example at the end of thirty days after the transaction, whether a rebate is due, it is possible that each transaction could be looked at during the thirty day period and a rebate check given if appropriate at any time during such period.

The rebate given would then be subtracted from the price paid to determine a new effective price which would then be used for subsequent comparisons to determine if the customer might be eligible for an additional rebate. However, it is believed preferable not to incur the additional administrative expense of providing multiple rebates.

Thus, while the invention has been particularly shown and described above with reference to a preferred embodiment, the foregoing and other changes in form and detail may be made therein by one skilled in the art without departing from the spirit and scope of the invention.

What is claimed is:

1. A method for utilizing a computer system to provide price protection to retail customers of a dealer for at least selected goods, the method comprising the steps of:
    a) storing in the computer system information on each retail transaction for the goods including customer information, product identification, date and price paid for each product;
    b) storing in the computer information on the selected goods advertised for sale by others within a selected geographic area, such information including product identification, advertisement date and advertised price;
    c) utilizing the computer to determine at selected time intervals whether automatic rebates are due to any customer, rebates being due when the computer determines that a product of the selected goods purchased by the customer has been advertised at a lower price by another within a selected time period after the purchase transaction, step (c) including the steps of comparing advertised products stored during step (b) with the transaction products stored during step (a) to find matches, and verifying that dates for the advertised product and transaction product are within the selected time period; and
    d) for each rebate which is determined due, printing a check to the customer for the difference between the price paid by the customer and the lower advertised sale price, which check is sent to the customer.

2. A method as claimed in claim 1 wherein step (c) further includes the step of comparing the transaction price to the advertised price for the matching product to determine if the advertised price is less, and if so by how much.

3. A method as claimed in claim 1 wherein steps (a), (b) and (c) are performed for a plurality of different geographic areas; and
    where step (c) includes the step of assuring that the retail transaction and the advertised sale are for the same geographic area.

4. A method as claimed in claim 3 wherein step (c) is performed separately for each of said geographic areas.

5. A method as claimed in claim 3 wherein a geographic indication is stored with each entry made during steps (a) and (b), and wherein step (c) includes the step of comparing geographic indications for products on which a rebate may be due.

6. A method as claimed in claim 1 wherein step (c) includes the step of determining the lowest advertised price for a selected time period for each product entered during step (b).

7. A method as claimed in claim 1 wherein step (c) includes the steps of determining the difference between the transaction price and the advertised price for each product eligible for a rebate, computing the sales tax on such difference, and adding the computed sales tax to the determined difference to obtain the amount to be rebated to the customer.

8. A method as claimed in claim 1 wherein step (c) includes the step of updating information in the computer system on a transaction to reflect any rebate sent to the customer.

9. A method as claimed in claim 1 wherein step (d) is performed by printing a check each time it is determined during step (c) that a rebate is due.

10. A method as claimed in claim 1 wherein step (c) includes the step of storing information on each rebate when it is determined that a rebate is due, and wherein step (d) includes the step of utilizing the stored information on each rebate to print the checks.

11. A method as claimed in claim 1 wherein step (d) includes the step of printing a mailing label for each of said checks.

12. A method as claimed in claim 1 wherein step (b) is performed only for products advertised for sale at a lower price than a standard price charged for such product by the dealer.

13. Apparatus for utilizing a computer system to provide price protection to retail customers of a dealer for at least selected goods comprising:
    means for storing in the computer system information on each retail transaction for the goods including customer information, product identification, date and price paid for each product;
    means for storing in the computer information on the selected goods advertised for sale by others within a selected geographic area, such information including product identification, advertisement date and advertised price;
    means for utilizing the computer to determine at selected time intervals whether automatic rebates are due to any customer, rebates being due when the computer determines that a product of the selected goods purchased by the customer has been advertised at a lower price by another within a selected time period after the purchase transaction; and
    means for printing a check to the customer for the difference between the price paid by the customer and the lower advertised sale price, which check is sent to the customer.

14. Apparatus as claimed in claim 13 wherein the means for utilizing includes means for comparing advertised products to transaction products to find matches, and means for verifying that dates for the advertised product and transaction product are within the selected time period.

15. Apparatus as claimed in claim 14 wherein said means for utilizing further includes means for comparing the transaction price to the advertised price for the matching product to determine if the advertised price is less, and if so by how much.

16. Apparatus as claimed in claim 13 wherein said means for utilizing includes means for determining the difference between the transaction price and the advertised price for each product eligible for a rebate, means for computing the sales tax on such difference, and means for adding the computed sales tax to the determined difference to obtain the amount to be rebated to the customer.

17. Apparatus as claimed in claim 13 wherein said means for utilizing includes means for updating information in the computer system on a transaction to reflect any rebate sent to the customer.

18. Apparatus as claimed in claim 13 wherein said means for utilizing includes means for storing information on each rebate when it is determined that a rebate is due, and wherein said means for printing includes means for utilizing the stored information on each rebate to print the checks.

19. Apparauts as claimed in claim 13 wherein said means for printing includes means for printing a mailing label for each of said checks.

* * * * *